US009594757B2

(12) United States Patent
Morimoto et al.

(10) Patent No.: US 9,594,757 B2
(45) Date of Patent: Mar. 14, 2017

(54) DOCUMENT MANAGEMENT SYSTEM, DOCUMENT MANAGEMENT METHOD, AND DOCUMENT MANAGEMENT PROGRAM

(71) Applicant: UBIC, Inc., Tokyo (JP)

(72) Inventors: Masahiro Morimoto, Tokyo (JP); Yoshikatsu Shirai, Tokyo (JP); Hideki Takeda, Tokyo (JP); Kazumi Hasuko, Tokyo (JP)

(73) Assignee: UBIC, Inc., Tokyo (JP)

( * ) Notice: Subject to any disclaimer, the term of this patent is extended or adjusted under 35 U.S.C. 154(b) by 0 days.

(21) Appl. No.: 14/648,634

(22) PCT Filed: Nov. 22, 2013

(86) PCT No.: PCT/JP2013/081522
§ 371 (c)(1),
(2) Date: May 29, 2015

(87) PCT Pub. No.: WO2014/084141
PCT Pub. Date: Jun. 5, 2014

(65) Prior Publication Data
US 2015/0310004 A1 Oct. 29, 2015

(30) Foreign Application Priority Data

Nov. 30, 2012 (JP) ................. 2012-263086

(51) Int. Cl.
*G06F 17/30* (2006.01)
*G06Q 50/18* (2012.01)
(52) U.S. Cl.
CPC .. *G06F 17/30011* (2013.01); *G06F 17/30705* (2013.01); *G06F 17/30713* (2013.01); *G06Q 50/18* (2013.01)

(58) Field of Classification Search
CPC ......... G06F 17/30011; G06F 17/30705; G06F 17/30713; G06Q 50/18
See application file for complete search history.

(56) References Cited

U.S. PATENT DOCUMENTS

2006/0271630 A1* 11/2006 Bensky ............... G06Q 10/107
709/206
2007/0271517 A1* 11/2007 Finkelman ........ G06F 17/30864
715/742

(Continued)

FOREIGN PATENT DOCUMENTS

JP 2002-197037 A 7/2002
JP 2007-059970 A 3/2007

(Continued)

OTHER PUBLICATIONS

International Application No. PCT/JP2013/081522, Written Opinion mailed Jan. 21, 2014.

*Primary Examiner* — William Spieler
(74) *Attorney, Agent, or Firm* — Lewis Roca Rothgerber Christie LLP

(57) ABSTRACT

It is possible to reduce a review load of a reviewer. A document management system acquires digital information recorded in a plurality of computers or a server and analyzes the acquired digital information for relevance to a lawsuit. The document management system includes a thread classification unit that verifies supplementary information of each piece of document data included in the digital information and classifies the document data into threads based on the supplementary information, a similarity analysis unit that extracts elements included in the supplementary information of the classified document data for each thread and analyzes similarity between the threads based on the (Continued)

extracted elements, and an integration unit that integrates the threads based on the similarity.

8 Claims, 7 Drawing Sheets

(56) References Cited

U.S. PATENT DOCUMENTS

| | | | | |
|---|---|---|---|---|
| 2010/0030753 A1* | 2/2010 | Nad | ............. | G06F 17/30864 707/722 |
| 2010/0325102 A1* | 12/2010 | Maze | ............. | G06F 17/30011 707/722 |
| 2011/0035403 A1* | 2/2011 | Ismalon | ............. | G06F 17/3064 707/769 |
| 2011/0041082 A1* | 2/2011 | Nguyen | ............. | G06Q 10/10 715/752 |
| 2011/0208722 A1* | 8/2011 | Hannuksela | ............. | G06F 17/3002 707/723 |
| 2012/0221638 A1* | 8/2012 | Edamadaka | ............. | G06Q 10/107 709/204 |
| 2012/0239666 A1 | 9/2012 | Morimoto et al. | | |
| 2012/0246185 A1 | 9/2012 | Morimoto et al. | | |
| 2012/0290578 A1 | 11/2012 | Morimoto et al. | | |
| 2012/0297313 A1* | 11/2012 | Sharma | ............. | G06Q 10/10 715/751 |
| 2013/0091021 A1* | 4/2013 | Maslov | ............. | G06Q 30/0251 705/14.69 |
| 2013/0110829 A1* | 5/2013 | Zhou | ............. | G06F 17/30864 707/728 |
| 2013/0226907 A1* | 8/2013 | Wolf | ............. | G06F 17/30554 707/722 |

FOREIGN PATENT DOCUMENTS

| | | |
|---|---|---|
| JP | 2007-172249 A | 7/2007 |
| JP | 2009-157450 A | 7/2009 |
| JP | 2011-209930 A | 10/2011 |
| JP | 2011-209931 A | 10/2011 |
| JP | 2012-032859 A | 2/2012 |
| JP | 2012-181851 A | 9/2012 |

* cited by examiner

DOCUMENT MANAGEMENT SYSTEM, DOCUMENT MANAGEMENT METHOD, AND DOCUMENT MANAGEMENT PROGRAM

CROSS REFERENCE TO RELATED APPLICATIONS

This application is a National Phase application under 35 U.S.C. §371 of PCT Application PCT/JP2013/081522, filed Nov. 22, 2013, which application claims priority benefit to Japanese Application Serial No. 2012-263086, filed Nov. 30, 2012, which applications are hereby incorporated by reference.

TECHNICAL FIELD

The present invention relates to a document management system, a document management method, and a document management program, and in particular, to a document management system, a document management method, and a document management program for collecting document information relating to a lawsuit.

BACKGROUND ART

In the related art, means or a technique has been proposed which collects and analyzes devices, data, and electronic records required to find or investigate the cause and substantiates legal evidence when there is a crime or a legal conflict related to computers, such as illegal access or confidential information leakage.

In a U.S. civil lawsuit, electronic discovery (eDiscovery) is required, and both the plaintiff and the defendant in the lawsuit have the responsibility to submit all of related digital information as evidence. For this reason, digital information recorded in the computer or the server needs to be submitted as evidence.

With the rapid development and spread of IT, most of information is created using the computer in the present business world. Therefore, there is flood of digital information within the same company.

For this reason, during the pretrial period, when evidence exhibit is submitted to court, even confidential digital information which is not necessarily related to the lawsuit may be likely to be included in the evidence exhibit submission. There is also a problem in that confidential document information which is not related to the lawsuit is submitted.

In recent years, a technique relating to document information in a document management system has been proposed in PTL 1 to PTL 3. PTL 1 discloses a document management system which designates a specific person from one or more subjects included in subject information regarding a person who is subject to an order to submit documents, extracts only digital document information which is accessed by the specific person based on access history information relating to the designated specific person, sets supplementary information indicating whether or not each document file of the extracted digital document information is related to a lawsuit, and outputs document files related to the lawsuit based on the supplementary information.

PTL 2 discloses a document management system which displays recorded digital information, sets subject specification information indicating whether or not each of a plurality of document files is related to any one of the subjects included in subject information, sets such that the set subject specification information is recorded in a storage unit, designates at least one or more subjects, searches for a document file in which the subject specification information corresponding to the designated subject is set, sets supplementary information indicating whether or not the searched document file is related to a lawsuit on a display unit, and outputs document files related to the lawsuit based on the supplementary information.

PTL 3 discloses a document management system which receives the designation of at least one or more document files included in digital document information, receives designation indicating a language used to translate the designated document file, translates the designated document file into the designated language, extracts a common document file indicating the same content as the designated document file from digital document information recorded in a recording unit, generates translation-related information indicating that the extracted common document file is translated by quoting the content of the translated document file, and outputs a document file related to a lawsuit based on the translation-related information.

CITATION LIST

Patent Literature

[PTL 1] JP-A-2011-209930
[PTL 2] JP-A-2011-209931
[PTL 3] JP-A-2012-32859

SUMMARY OF INVENTION

Technical Problem

However, for example, in the document management systems disclosed in PTL 1 to PTL 3, a huge amount of document information of the subjects who use a plurality of computers and servers is collected.

In an operation of classifying whether or not a huge amount of digital document information is appropriate as evidence exhibit of the lawsuit, a user who is called a reviewer needs to visibly check the document information and classify each piece of document information. Therefore, there is a tendency to take a lot of effort and time to perform the operation, and further improvement is required.

According, the invention has been made in view of the above-described problems, and an object of the invention is to provide a document management system, a document management method, and a document management program capable of further reducing a review load of a reviewer.

Solution to Problem

According to an aspect of the invention, there is provided a document management system that acquires digital information recorded in a plurality of computers or a server and analyzes the acquired digital information for relevance to a lawsuit. The document management system includes a thread classification unit that verifies supplementary information of each piece of document data included in the digital information and classifies the document data into threads based on the supplementary information, a similarity analysis unit that extracts elements included in the supplementary information of the classified document data for each thread and analyzes similarity between the threads based on the extracted elements, and an integration unit that integrates the threads based on the similarity.

The "supplementary information" refers to information incidental to document data. For example, the supplementary information may be tag information tagged to structure document data.

The "thread" refers to a set of document data relating to specific information. For example, the thread classification unit can classify document data with electronic mail described in common content and reply mail to electronic mail as a single thread.

The document management system may further include a document data classification unit that classifies document data included in the digital information into single document data, main document data, dependent document data dependent on the main document data, and other document data. The thread classification unit may classify at least the single document data and the main document data.

The thread classification unit may further classify each piece of dependent document data into the same thread of corresponding main document data.

The thread classification unit may treat at least one of the title, creation date and time, updated date and time, and creator name of the document data as supplementary information.

The other document data may include non-structured document data with no supplementary information, and the thread classification unit may refer to the content of the non-structured document data when classifying the non-structured document data.

The integration unit may integrate each piece of dependent document data into the same thread of corresponding main document data.

The document management system may further include an extraction unit that extracts a predetermined number of pieces of document data from the integrated thread, a screen display unit that displays the extracted document data on a screen, a result reception unit that receives a determination result of relevance by the user on the displayed document data, a selection unit that classifies the extracted document data for each determination result based on the determination result and analyzes and selects an element commonly appearing in the classified document data, an element recording unit that records the selected element, a search unit that searches for an element recorded in the element recording unit from the document data, and a score calculation unit that calculates a score indicating relevance between the determination result and document data using a search result of the search unit and an analysis result of the selection unit.

According to another aspect of the invention, there is provided a document management method that acquires digital information recorded in a plurality of computers or a server and analyzes the acquired digital information for relevance to a lawsuit. The document management method causes a computer to execute a step of verifying supplementary information of each piece of document data included in the digital information and classifying the document data into threads based on the supplementary information, a step of extracting elements included in the supplementary information of the classified document data for each thread and analyzing similarity between the threads based on the extracted elements, and a step of integrating the threads based on the similarity.

According to still another aspect of the invention, there is provided a document management program that acquires digital information recorded in a plurality of computers or a server and analyzes the acquired digital information for relevance to a lawsuit. The document management program causes a computer to implement a function of verifying supplementary information of each piece of document data included in the digital information and classifying the document data into threads based on the supplementary information, a function of extracting elements included in the supplementary information of the classified document data for each thread and analyzing similarity between the threads based on the extracted elements, and a function of integrating the threads based on the similarity.

Advantageous Effects of Invention

The document management system of the invention acquires digital information recorded in a plurality of computers or a server and analyzes the acquired digital information for relevance to the lawsuit. The document management system includes the thread classification unit that verifies the supplementary information of each piece of document data included in the digital information and classifies the document data into threads based on the supplementary information, the similarity analysis unit that extracts elements included in the supplementary information of the classified document data for each thread and analyzes similarity between the threads based on the extracted elements, and the integration unit that integrates the threads based on the similarity. Therefore, when the user determines (reviews) relevance, it is possible to perform a review in terms of identical document data, and to implement reduction of a review load and improvement of efficiency of a review.

The document management system further includes a document data classification unit that classifies document data included in the digital information into single document data, main document data, dependent document data dependent on the main document data, and other document data. The thread classification unit classifies at least the single document data and the main document data. Therefore, it is possible to classify at least single document data and main document data into threads.

The integration unit integrates each piece of dependent document data into the same thread of corresponding main document data. Therefore, it is possible to integrate document data having dependence into the same thread.

The thread classification unit further classifies each piece of dependent document data into the same thread of corresponding main document data. Therefore, it is possible to classify document data having dependence into the same thread.

The thread classification unit treats at least one of the title, creation date and time, updated date and time, and creator name of the document data as supplementary information. Therefore, it is possible to classify document data into threads based on information other than the content of document data.

The other document data includes non-structured document data with no supplementary information, and the thread classification unit refers to the content of the non-structured document data when classifying the non-structured document data. Therefore, it is possible to classify even document data with no supplementary information into threads by alternative means.

The document management system further includes an extraction unit that extracts a predetermined number of pieces of document data from the integrated thread, a screen display unit that displays the extracted document data on a screen, a result reception unit that receives a determination result of relevance by the user on the displayed document data, a selection unit that classifies the extracted document data for each determination result based on the determination result and analyzes and selects an element commonly appearing in the classified document data, an element recording unit that records the selected element, a search unit that searches for an element recorded in the element recording unit from the document data, and a score calculation unit that calculates a score indicating relevance between the determination result and document data using a search result of the search unit and an analysis result of the selection unit. Therefore, it is possible to allow the system to automatically review identical document data based on the review result of the user, and to improve review accuracy.

DESCRIPTION OF EMBODIMENTS

First Embodiment

Hereinafter, a first embodiment of the invention will be described referring to FIGS. 1 to 4.

Figure 1:
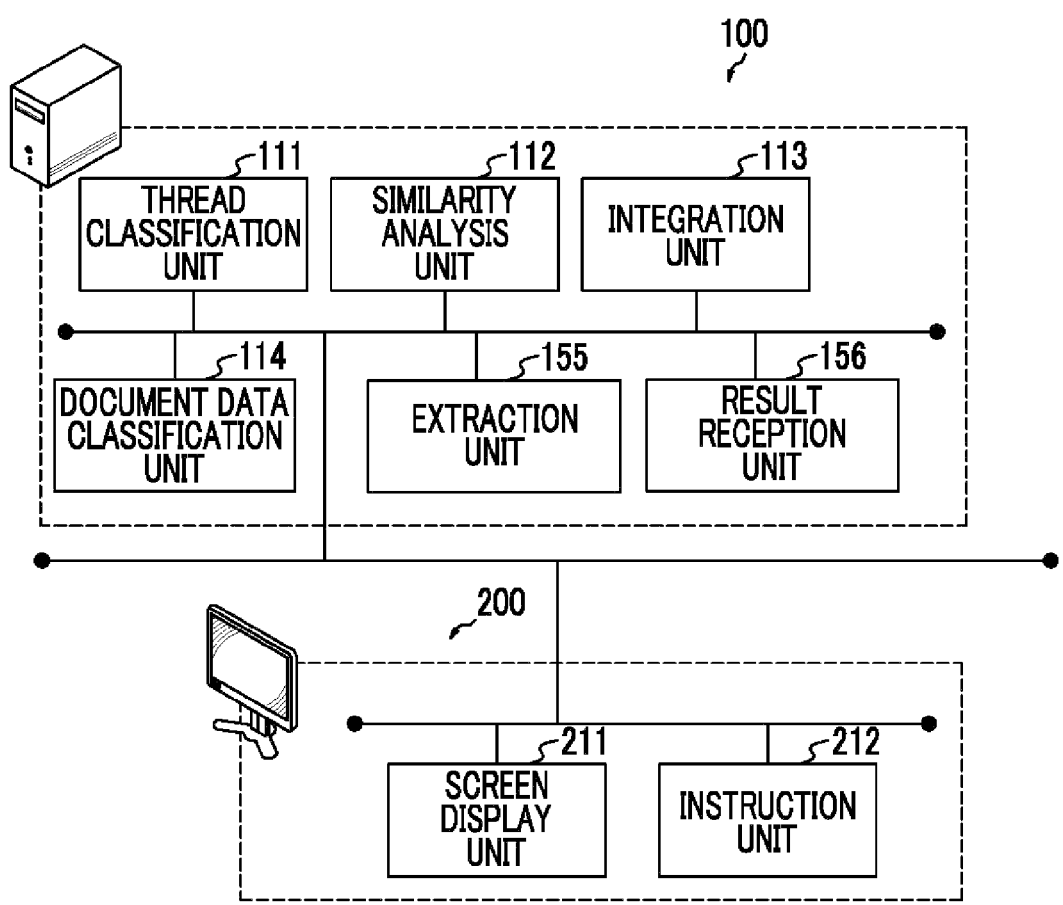
FIG. 1 is a block diagram of a document management system according to a first embodiment of the invention.

FIG. 1 is a block diagram of a document management system according to this embodiment.

The document management system includes a computer or a server, and a CPU executes a program recorded in a ROM based on various inputs to operate as various functional units. The program may be stored in a storage medium, such as a CD-ROM, or may be distributed through a network, such as the Internet, and then installed on the computer.

The document management system according to the first embodiment of the invention includes a client terminal 200, and a server apparatus 100. The client terminal 200 includes a screen display unit 211 that displays a plurality of pieces of document data extracted from digital information to be determined for relevance to a lawsuit by a user, and an instruction unit 212 that receives an input from the user.

The server apparatus 100 includes a thread classification unit 111 that verifies supplementary information of each piece of document data included in the digital information and classifies the document data into threads based on the supplementary information, a similarity analysis unit 112 that extracts elements included in the supplementary information of the classified document data for each thread and analyzes similarity between the threads based on the extracted elements, and an integration unit 113 that integrates the threads based on the similarity. The server apparatus 100 further includes a document data classification unit 114 that classifies document data included in the digital information into single document data, main document data, dependent document data dependent on the main document data, and other document data. At this time, the thread classification unit 111 classifies at least the single document data and the main document data. The server apparatus further includes an extraction unit 155 that extracts a predetermined number of pieces of document data from the integrated thread, and a result reception unit 156 that receives a determination result of relevance by the user on the document data displayed on the screen display unit 211.

In electronic discovery (eDiscovery), an operation (referred to as a review) of classifying whether or not a huge amount of digital document information is appropriate as evidence exhibit of the lawsuit is required. The review (relevance determination) refers to that the system or a person determines whether or not document data is to be submitted to the lawsuit. For example, in the review, a document group, which is document data to be reviewed, is classified into a plurality of types based on the degree of relevance to the lawsuit or how document data is related to the lawsuit.

In the document management system according to this embodiment, as a stage prior to performing the review, a set of document data is created based on predetermined requirements. A user who is called a reviewer determines relevance to the lawsuit on the collected document data in order to extract document data required to be submitted for the lawsuit from document data. With this, it is possible to allow the reviewer to review identical document data, and to achieve improvement of efficiency of a review and reduction of a review load.

Document data refers to information including one or more words. It is preferable that document data has information including one or more words as the content of a text, and has supplementary information as information other than the text. The supplementary information refers to meta information. For example, the supplementary information may mean information related to document data, such as the creation date and time, creator, data format, or title of document data.

Examples of document data include electronic mail, a presentation document, a table calculation document, a meeting document, a contract, an organization chart, and a business plan. In addition, scan data can be treated as document data. In this case, the document management system may include an optical character reader (OCR) device such that scan data can be converted to text data. When scan data is changed to text data by the OCR device, it is possible to analyze or search for elements described below from scan data. Document data may be classified into single document data, main document data, dependent document data, and other document data by a process of the document data classification unit 114 described below.

The function of each component described in FIG. 1 will be described.

The server apparatus 100 and the client terminal 200 are connected through a communication network. The communication network refers to a wired or wireless communication line. For example, the communication network is a telephone line or an Internet line.

The screen display unit 211 is a display or a liquid crystal monitor that displays document data to be reviewed on the client terminal 200. The instruction unit 212 is a mouse or a keyboard provided in the client terminal 200, and receives an operation or an input from the user.

The document data classification unit 114 classifies document data into single document data, main document data, dependent document data dependent on main document data, and other document data. Dependent document data refers to document data, such as an attached file to electronic mail, which has dependence on main document data (in this case, electronic mail). Single document data refers to document data with no dependent document data. Other document data refers to document data that does not correspond to any of single document data, main document data, and dependent document data. For example, non-structured document data corresponds to other document data. Non-structured document data means document data with no supplementary information. Specifically, electronic mail with no subject corresponds to non-structured document data.

The thread classification unit 111 classifies document data into threads based on supplementary information. For example, when classifying electronic mail, the thread classification unit 111 classifies electronic mail having the same subject or having "Re:" indicating reply with the same subject or "FW:" indicating forwarding into the same thread based on the subject of electronic mail. In addition to the subject, the thread classification unit 111 may treat at least one of the title, creation date and time, updated date and time, and creator name of the document data as supplementary information. When classifying non-structured document data with no supplementary information, such as electronic mail with no subject, the thread classification unit 111 may refer to the content of the non-structured document data when classifying the non-structured document data. That is, when classifying electronic mail, which is non-structured document data, electronic mail is classified based on the text in electronic mail.

The similarity analysis unit 112 analyzes similarity between threads. In particular, it is preferable that the similarity analysis unit 112 analyzes similarity between threads for each thread based on elements included in supplementary information of electronic mail included in the thread. The element refers to a component of document data, such as a word, a symbol, or a figure included in document data. For example, the element may be each phoneme of a set of phonemes, such as a morpheme, which is smallest phonetic unit that can be divided without losing its meaning in a given language. For example, the elements of a sentence of "perform classification of a document" may be "document", "classification", and "perform".

The integration unit 113 integrates threads based on similarly of supplementary information of document data included in each thread. The integration unit 113 integrates each piece of dependent document data into the same thread of main document data. The integration unit 113 defines the integrated thread as a cluster.

In this embodiment, the extraction unit 155 extracts a predetermined number of pieces of document data to be reviewed by the user from document data included in the thread (cluster) integrated by the integration unit 113. The extraction may be performed randomly or based on an attribute, such as updated date and time of document data.

The result reception unit 156 receives a review result of each piece of document data by the user. The user assigns an identification code to document data according to the degree of relevance to the lawsuit in the review. For example, a "Responsive" code is assigned to document data which has high relevance to the lawsuit and is required to be submitted as evidence, and a "Non-Responsive" code is assigned to document data not required to be submitted. A "HOT" code is assigned to document data, which has high relevance to the lawsuit and is particularly important evidence, among document data assigned with the "Responsive" code together with the "Responsive" code. It is assumed that a "PRODUCT A" code is assigned to document data, which has a content with high relevance to a product A, among document data assigned with the "Responsive" code, and a "PRODUCT B" code is assigned to document data, which has a content with high relevance to a product B, among document data assigned with the "Responsive" code. At this time, the result reception unit 156 can receive each identification code as a result of relevance determination.

Figure 2:
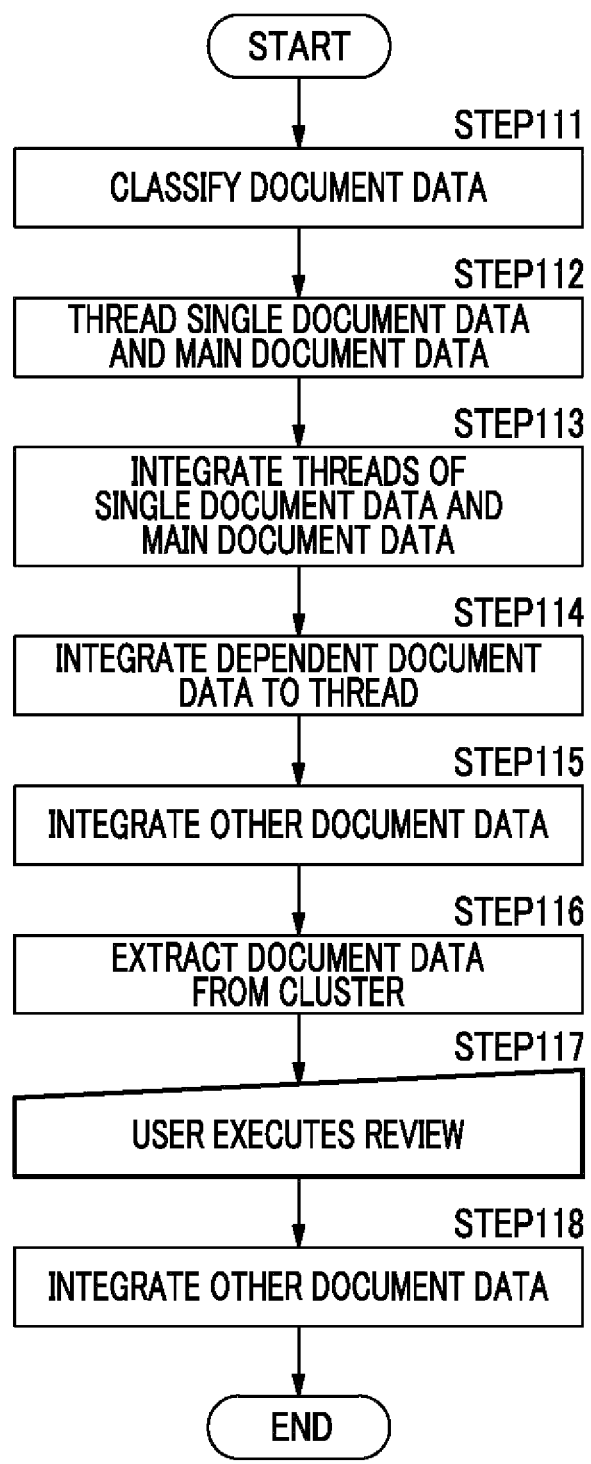
FIG. 2 is a flowchart showing a process flow according to the first embodiment of the invention.
Figure 3:
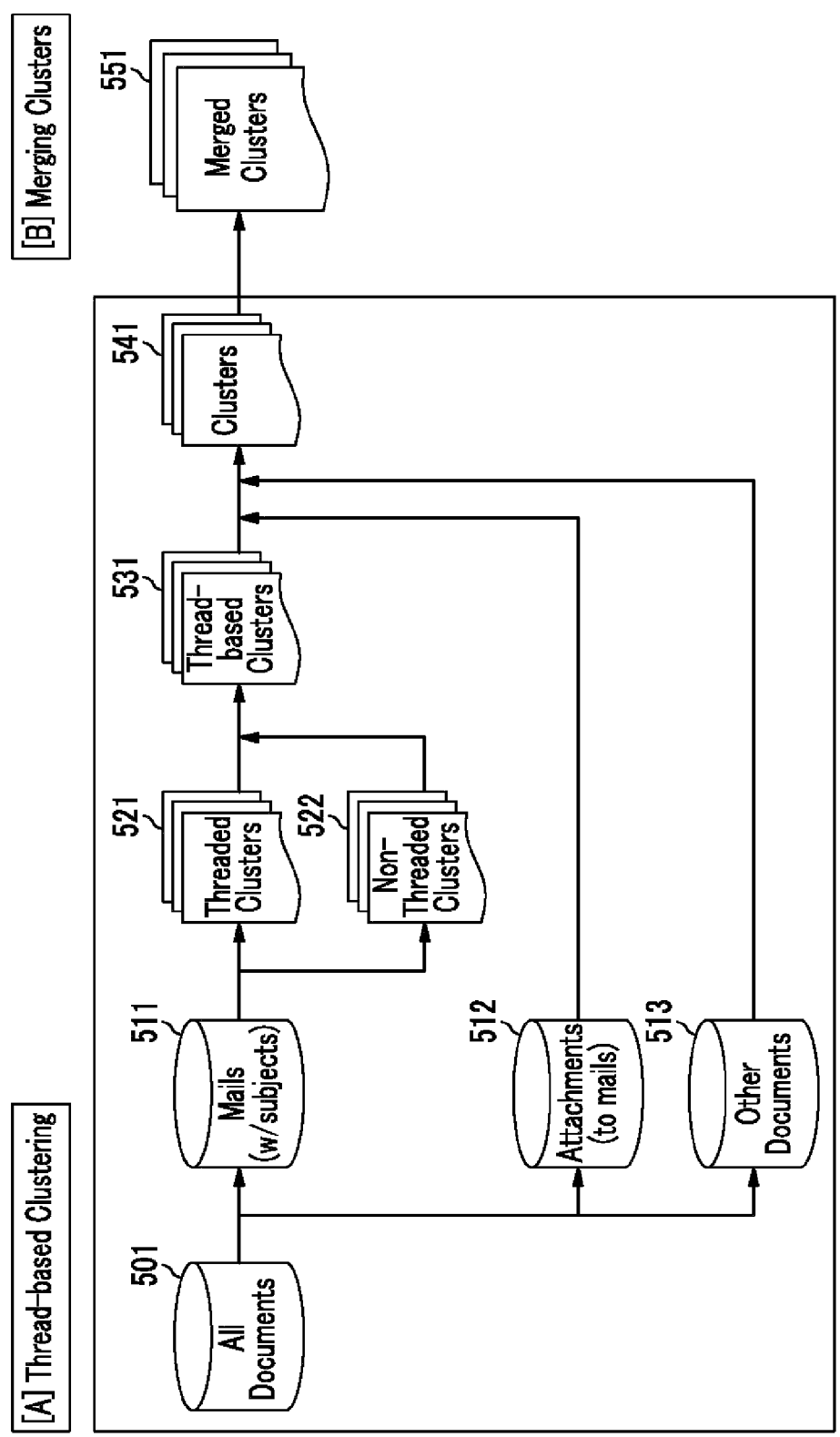
FIG. 3 is a schematic view showing a manner in which document data is classified by the process according to the first embodiment of the invention.

Next, the flow of a process of the document management system will be described referring to FIGS. 2 and 3. FIG. 2 is a flowchart showing the flow of a process of the document management system according to this embodiment. FIG. 3 is a diagram schematically showing a manner in which document data is clustered when performing the process shown in FIG. 2.

First, in FIG. 2, the document data classification unit 114 classifies document data (STEP 111). Specifically, as shown in FIG. 3, the document data classification unit 114 classifies electronic mail among all pieces of collected document data 501 (ALL Documents) into a Mails group 511, classifies files attached to electronic mail into an Attachments group 512, and classifies document data, which is neither electronic mail nor an attached file, into an Other Documents group 513.

Figure 4:
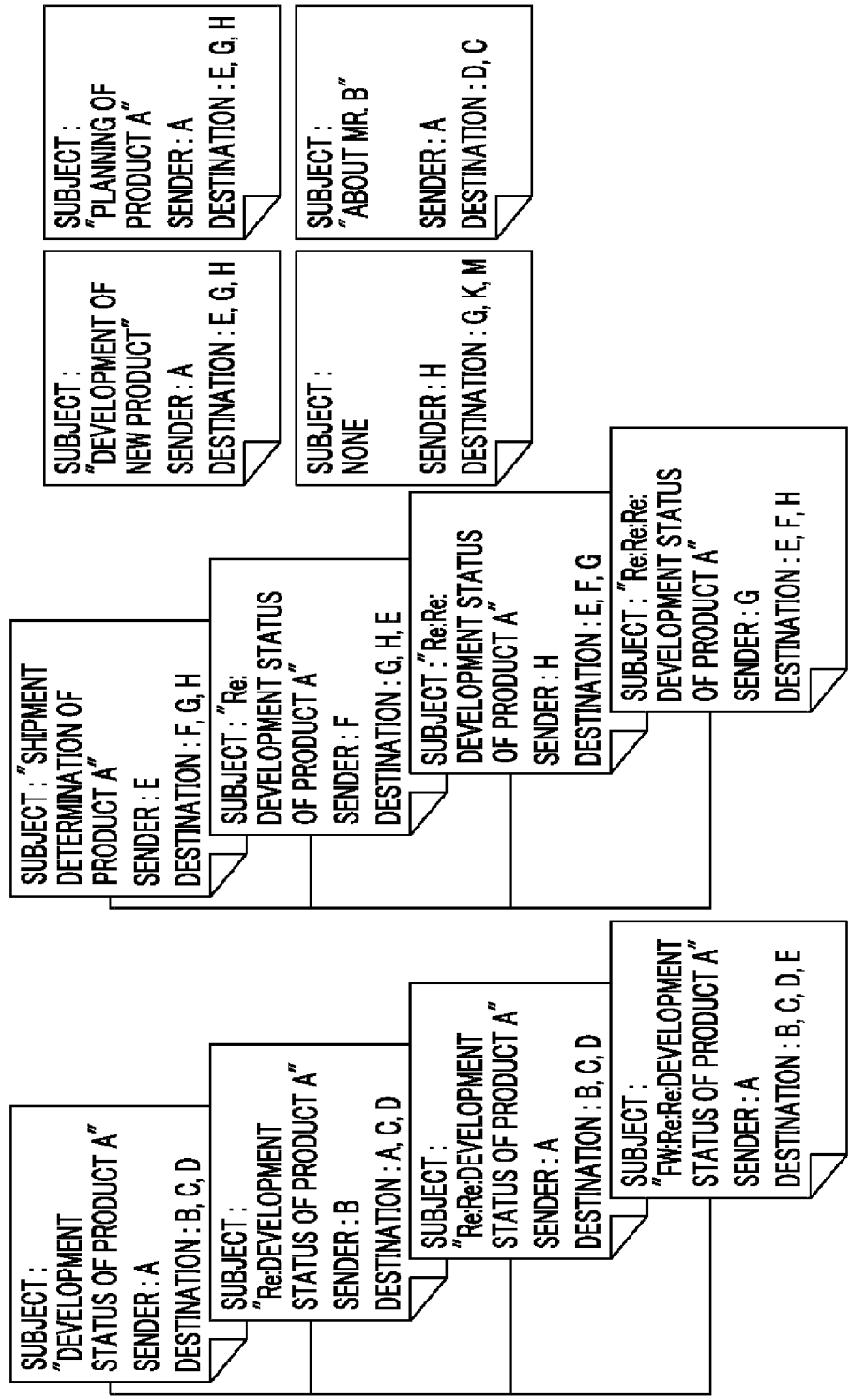
FIG. 4 is a schematic view showing a master-slave relationship of electronic mail according to the first embodiment of the invention.

Next, the thread classification unit 111 sets supplementary information as a subject of electronic mail and classifies documents of the Mails group 511 into a threaded group (Threaded Clusters) 521 or a non-threaded group 522 (Non-Threaded Clusters) based on the subject of electronic mail. For example, as shown in FIG. 4, it is assumed that electronic mails of a subject "DEVELOPMENT STATUS OF PRODUCT A" are one master mail, two reply mails, one forwarded mail, and electronic mails of a subject "SHIPMENT DETERMINATION OF PRODUCT A" are one master mail and three reply mails. In addition, a case where mails having only master mail are mails of subjects "DEVELOPMENT OF NEW PRODUCT", "PLANNING OF PRODUCT A", and "ABOUT MR. B", and one mail with no subject will be described as an example. At this time, electronic mail of the subjects "DEVELOPMENT STATUS OF PRODUCT A", "Re:DEVELOPMENT STATUS OF PRODUCT A", "Re:Re:DEVELOPMENT STATUS OF PRODUCT A", and "FW:Re:Re:DEVELOPMENT STATUS OF PRODUCT A" has the same supplementary information and are thus classified into the same thread (FIG. 2, STEP 112). Electronic mail having only master mail is not threaded, and is collected into the non-threaded group 522 of FIG. 3.

Next, the integration unit 113 integrates threads included in the threaded group 521 and document data included in the non-threaded group 522 based on similarity between the threads to form a threaded group 531 (Threaded-based Clusters) (STEP 113). At this time, the integration unit 113 combines supplementary information of document data belonging to the thread and generates supplementary information representing the thread. Specifically, elements included in the supplementary information are extracted and a combined vector is generated based on the distribution of similarity between the elements. Document data with supplementary information having high similarity to combined supplementary information among document data classified into the non-threaded group 522 is integrated into a thread in the threaded group 521 of the combined supplementary information.

The integration unit 113 performs a process for integrating dependent document data classified into the Attachments group into threads and clustering the threads into clusters 541 (Clusters) (STEP 114). It is desirable that dependent document data is integrated into the same thread as electronic mail attached with dependent document data.

The integration unit 113 integrates document data classified into the Other Documents group (STEP 115). A supplementary information vector is created from the file names (excluding an extension) of the document data, and similarity to the combined vector created in STEP 114 is calculated. If the maximum similarity is equal to or greater than a threshold value, document data is integrated into the most similar cluster. In regard to document data which has not been integrated by this process, a vector is constituted from all of other document data, and similarity to the previous combined vector is calculated. Document data is integrated into a cluster where the maximum similarity is equal to or greater than the threshold value. All of other document data, which has not been integrated in the above-described manner are collected and are integrated into another cluster.

The extraction unit 155 extracts document data to be reviewed from each created cluster (STEP 116). Although the extraction unit 155 extracts document data by random sampling, the extraction unit 155 may extract document data in order of creation date and time or a creator name.

The user reviews the extracted document data (STEP 117), and the result reception unit 156 receives the review result (STEP 118). With this, it is possible to review identical document data.

Second Embodiment

Hereinafter, a second embodiment of the invention will be described referring to FIGS. 5 to 7.

Figure 5:
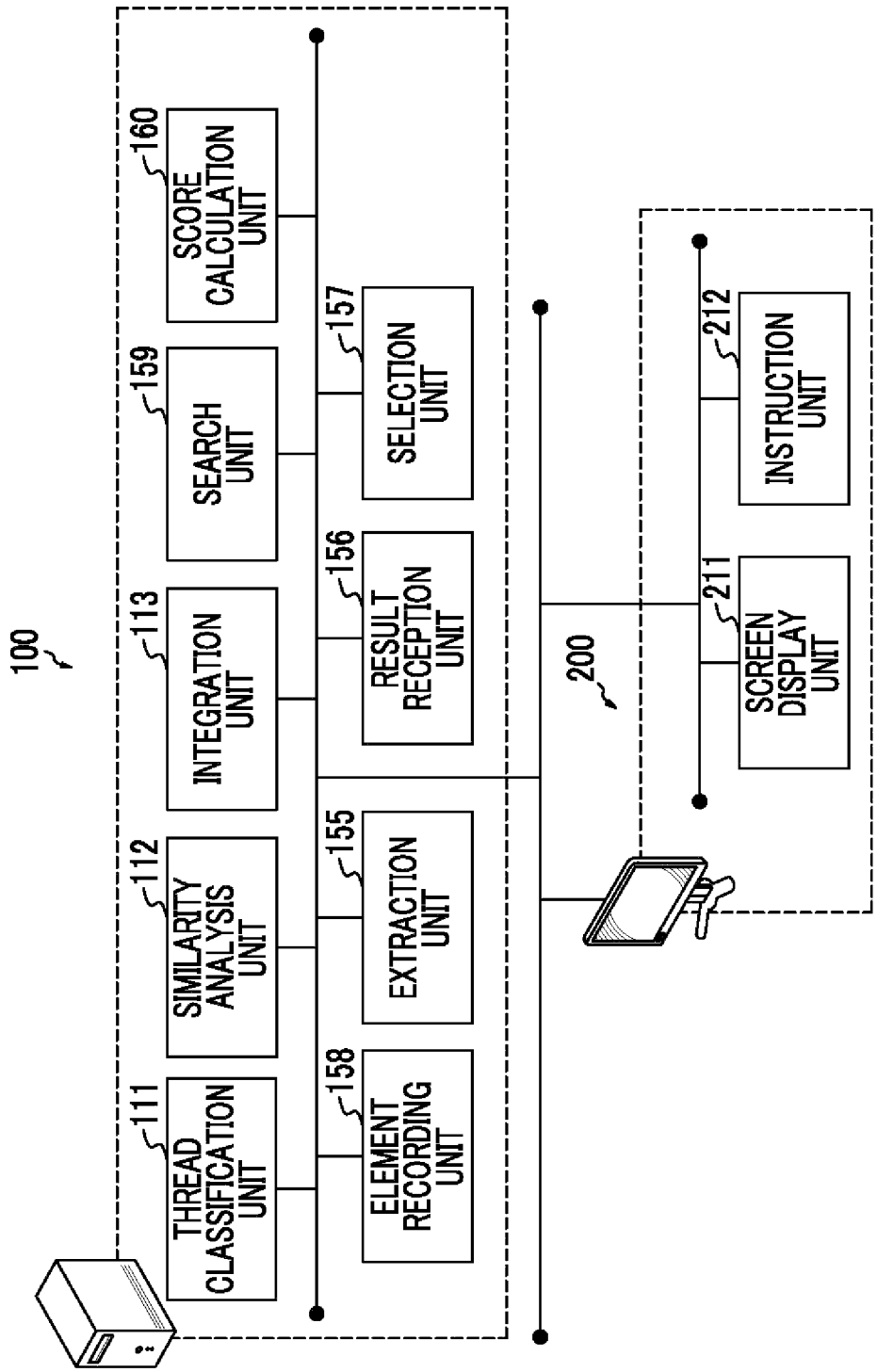
FIG. 5 is a block diagram of a document management system according to a second embodiment of the invention.

FIG. 5 is a block diagram of a document management system according to this embodiment.

The document management system according to the second embodiment of the invention includes a client terminal 200 and a server apparatus 100. The client terminal 200 includes a screen display unit 211 that displays a plurality of pieces of document data extracted from digital information to be determined for relevance to a lawsuit by a user, and an instruction unit 212 that receives an input from the user.

The server apparatus 100 includes a thread classification unit 111 that verifies supplementary information of each piece of document data included in the digital information and classifies the document data into threads based on the supplementary information, a similarity analysis unit 112 that extracts elements included in the supplementary information of the classified document data for each thread and analyzes similarity between the threads based on the extracted elements, and an integration unit 113 that integrates the threads based on the similarity.

The server apparatus 100 includes an extraction unit 155 that extracts a predetermined number of pieces of document data from the integrated thread, a result reception unit 156 that receives a determination result of relevance by the user on the document data displayed on the screen display unit 211, a selection unit 157 that classifies the extracted document data for each determination result based on the determination result and analyzes and selects an element commonly appearing in the classified document data, an element recording unit 158 that records the selected element, a search unit 159 that searches for an element recorded in the element recording unit 158 from the document data, and a score calculation unit 160 that calculates a score indicating relevance between the determination result and document data using a search result of the search unit 159 and an analysis result of the selection unit 157.

The selection unit 157 selects an element. The selection unit 157 may analyze and select an element commonly appearing in document data with the same determination result. The determination result refers to a result of determination of relevance to the lawsuit on the document group by the user. The determination result may indicate a classification code indicating the degree of relevance to the lawsuit assigned to a document by the user. The selection unit 157 may refer to an evaluation value of an element when selecting an element.

The evaluation value refers to a value indicating the characteristics of the element. The evaluation value may indicate the amount of transmitted information of the element. The amount of transmitted information refers to an amount indicating the measure of interdependence between two probability variables in probability theory and information theory. Specifically, the amount of transmitted information may indicate the dependence between the element and the determination result of relevance to a document including the element.

Figure 6:
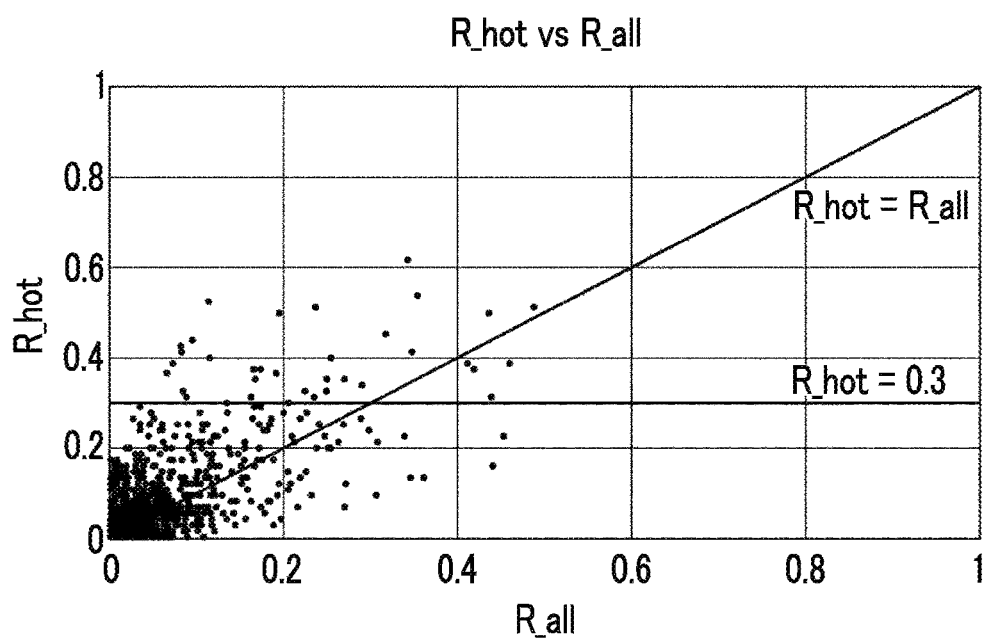
FIG. 6 is a graph showing an analysis result in a selection unit according to the second embodiment of the invention.
Figure 7:
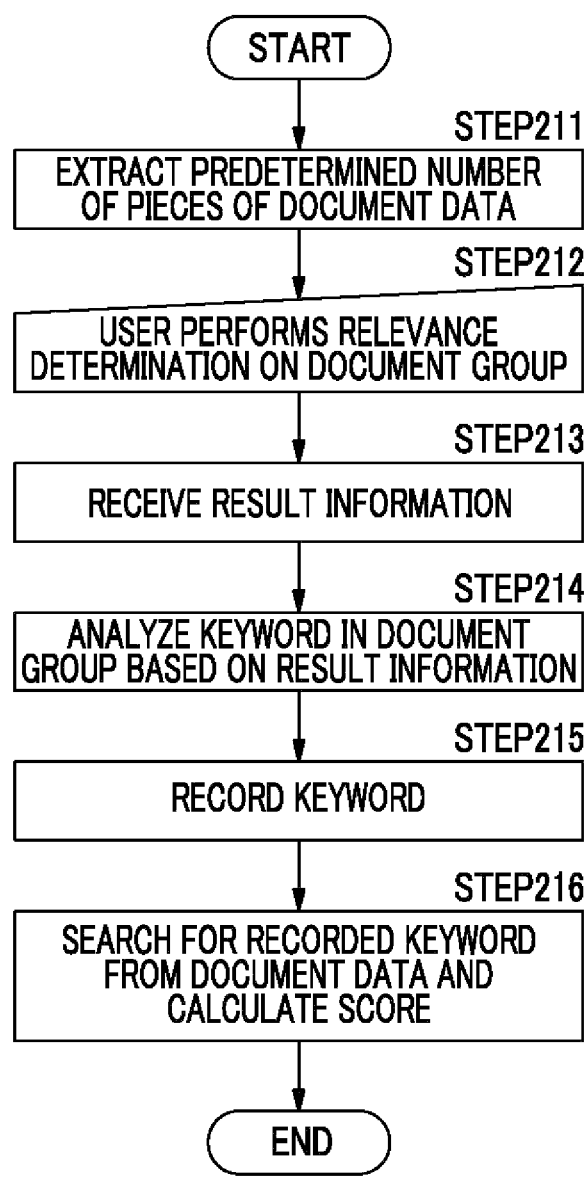
FIG. 7 is a flowchart showing a process flow according to the second embodiment of the invention.

FIG. 6 is a graph of an analysis result in the selection unit 157 for an element commonly frequently appearing in document data determined to have relevance. In FIG. 6, the vertical axis R_hot indicates the ratio of document data determined to have relevance including an element selected as an element associated with document data determined to have relevance among all pieces of document data determined to have relevance by the user. The horizontal axis R_all indicates the ratio of document data, which includes an element searched by the search unit 159 described below, among all pieces of document data reviewed by the user. In this embodiment, the selection unit 157 selects an element plotted above a line R_hot=R_all as a common element in document data determined to have relevance.

The element recording unit 158 records elements. The element recording unit 158 may be used as a database.

The search unit 159 searches for an element from document data.

The score calculation unit 160 calculates the score of document data. The score calculation unit 118 may calculate the score based on the evaluation value of an element included in the document data. The evaluation value may be calculated based on the appearance frequency of the element in document data or the amount of transmitted information, and may refer to the amount of information of the element exerted in certain document data.

The score refers to the degree of relevance to the lawsuit in certain document data. The score is calculated based on an element included in document data. For example, document data, in which an element especially required to be submitted at the lawsuit, may have a high score. Document data may be assigned with the initial value of the score based on given requirements. For example, the initial score may be calculated based on an element appearing in document data and the evaluation value of the element.

The score calculation unit 160 can calculate the score based on an element appearing in the document group and the evaluation value of the element from the following expression.

Equation 1

$$Scr = \sum_{i=0}^{N} i*(m_i * wgt_i^2) / \sum_{i=0}^{N} i * wgt_i^2 \qquad (1)$$

$m_i$: the appearance frequency of an i-th element
$wgt_i$: the evaluation value of the i-th element The evaluation value of each element is determined based on the amount of transmitted information of the element. The evaluation value can be learned by the following expression.

Equation 2

$$\frac{wgt_{i,L} + \sqrt{wtg_{L-i}^2 + \gamma_L wgt_{i,L}^2 - \theta}}{\sqrt{wgt_{i,L}^2 + \Sigma_{l=1}^{L}(\gamma_l wgt_{i,l}^2 - \theta)}} \quad (2)$$

$wgt_{i,0}$: the evaluation value (initial value) of a selected i-th element before learning
$wgt_{i,L}$: the evaluation value of the selected i-th element after L-th learning
$\gamma_L$: a learning parameter in L-th learning
$\theta$: the threshold value of a learning effect A process flow of a prediction information generation process in this embodiment will be described referring to FIG. 7. First, the extraction unit 155 extracts a predetermined number of pieces of document data from the cluster integrated by the integration unit 113 (STEP 211). The screen display unit 211 displays the extracted document data on the client terminal 200 (STEP 212). The result reception unit 156 receives a result of relevance determination of the user (STEP 213), and the selection unit 157 analyzes document data from the result of relevance determination of the user and selects an element (STEP 214). The selected element is recorded by the element recording unit 158 (STEP 215). Next, the search unit 159 searches for the recorded element from each piece of document data, and the score calculation unit 160 calculates the score of each piece of document data using Expression (1) (STEP 216).

Other components and functions are the same as those in the first embodiment.

The document management system acquires digital information recorded in a plurality of computers or a server and analyzes the acquired digital information for relevance to a lawsuit. The document management system includes a thread classification unit 111 that verifies supplementary information of each piece of document data included in the digital information and classifies the document data into threads based on the supplementary information, a similarity analysis unit 112 that extracts elements included in the supplementary information of the classified document data for each thread and analyzes similarity between the threads based on the extracted elements, and an integration unit 113 that integrates the threads based on the similarity. Therefore, when the user determines (reviews) relevance, it is possible to perform a review in terms of identical document data, and to implement reduction of a review load and improvement of efficiency of a review.

The document management system further includes a document data classification unit 114 that classifies document data included in the digital information into single document data, main document data, dependent document data dependent on the main document data, and other document data. The thread classification unit 111 classifies at least single document data and main document data. Therefore, it is possible to classify at least single document data and main document data into threads.

The integration unit 113 integrates each piece of dependent document data into the same thread of corresponding main document data. Therefore, it is possible to integrate document data having dependence into the same thread.

The thread classification unit 111 further classifies each piece of dependent document data into the same thread of corresponding main document data. Therefore, it is possible to classify document data having dependence into the same thread.

The thread classification unit 111 treats at least one of the title, creation date and time, updated date and time, and creator name of the document data as supplementary information. Therefore, it is possible to classify document data into threads based on information other than the content of document data.

The other document data includes non-structured document data with no supplementary information, and the thread classification unit 111 refers to the content of the non-structured document data when classifying the non-structured document data. Therefore, it is possible to classify even document data with no supplementary information into threads by alternative means.

The document management system further includes the extraction unit 155 that extracts a predetermined number of pieces of document data from the integrated thread, the screen display unit 211 that displays the extracted document data on the screen, the result reception unit 156 that receives a determination result of relevance by the user on the displayed document data, the selection unit 157 that classifies the extracted document data for each determination result based on the determination result and analyzes and selects an element commonly appearing in the classified document data, the element recording unit 158 that records the selected element, the search unit 159 that searches for an element recorded in the element recording unit 158 from the document data, and the score calculation unit 160 that calculates a score indicating relevance between the determination result and document data using the search result of the search unit 159 and the analysis result of the selection unit 157. Therefore, it is possible to allow the system to automatically review identical document data based on the review result of the user, and to improve review accuracy.

Other Embodiments

Although the embodiments of the invention have been described, the invention is not limited to the above-described embodiments, and various modifications and alterations may be made based on the technical idea of the invention.

For example, in the foregoing embodiments, the thread classification unit 111 classifies main document data and single document data among document data into threads. However, the thread classification unit 111 may further classify each piece of dependent document data into the same thread of corresponding main document data.

REFERENCE SIGNS LIST

100: server apparatus
111: thread classification unit
112: similarity analysis unit
113: integration unit
114: document data classification unit
155: extraction unit
156: result reception unit
157: selection unit
158: element recording unit
159: search unit
160: score calculation unit
200: client terminal
211: screen display unit
212: instruction unit

The invention claimed is:

1. A document management system that acquires digital information recorded in a plurality of computers or a server and analyzes the acquired digital information, wherein the acquired digital information includes a plurality of documents having supplementary information;

the document management system comprising:
an electronic storage medium storing a computer program including one or more functional units;
at least one processor in communication with the electronic storage medium and configured to execute the one or more functional units, the one or more functional units including:
a thread classification unit configured to verify the supplementary information originally contained in each of the plurality of documents included in the digital information and to classify each of the plurality of documents into one of a plurality of threads based on the supplementary information of each document, wherein the supplementary information includes information about the respective document for structuring document data thereof;
a similarity analysis unit configured to extract elements included in the supplementary information of the classified documents in each thread of the plurality of threads and to analyze similarity between the plurality of threads based on the elements extracted from each thread;
an integration unit configured to integrate the plurality of threads based on the similarity between the plurality of threads to create a plurality of integrated threads;
an extraction unit configured to extract a predetermined number of extracted documents from the plurality of the integrated threads;
a screen display unit configured to present a display of the extracted documents on a screen;
a result reception unit configured to receive a determination result of relevance of the extracted documents document data from a user based on the display of the extracted documents;
a selection unit configured to classify the extracted documents having a same determination result and to determine a common element commonly appearing among the extracted elements of the extracted documents having the same determination result;
an element recording unit configured to record the common element;
a search unit configured to search the plurality of documents for the common element recorded in the element recording unit to create a search result; and
a score calculation unit configured to calculate a relevance score of at least one of the plurality of documents, the relevance score indicating relevance of the at least one of the plurality of documents based on the search result.

2. The document management system according to claim 1,
wherein the digital information further includes a plurality of other documents, the system further comprising:
a document data classification unit configured to classify the plurality of documents and the plurality of other documents into single documents, main documents, dependent documents dependent on the main documents, and other documents,
wherein the thread classification unit classifies at least the single documents and the main documents, and
wherein the supplementary information includes metadata information about the respective document.

3. The document management system according to claim 2,
wherein the other documents include non-structured document data with no supplementary information, and the thread classification unit refers to the content of the non-structured document data when classifying the other documents.

4. The document management system according to claim 2,
wherein the integration unit integrates each dependent document into the same thread as a corresponding main document.

5. The document management system according to claim 2,
wherein the thread classification unit further classifies each dependent document into the same thread as a corresponding main document.

6. The document management system according to claim 1,
wherein supplementary information includes at least one of a title, creation date and time, updated date and time, and creator name of the plurality of documents.

7. A document management method, implemented in a computer system comprising at least one processor configured to execute one or more functional units, that acquires digital information recorded in a plurality of computers or a server and analyzes the acquired digital information, wherein the acquired digital information includes a plurality of documents having supplementary information, the document management method comprising:
verifying supplementary information originally contained in each of the plurality of documents included in the digital information and classifying each of the documents into a plurality of threads based on the supplementary information, wherein the supplementary information includes information about the respective document for structuring document data thereof;
extracting elements included in the supplementary information of the classified documents for each thread of the plurality of threads and analyzing similarity between the plurality of threads based on the elements extracted from each thread;
integrating the threads based on the similarity between the plurality of threads to create a plurality of integrated threads;
extracting a predetermined number of extracted documents from the plurality of the integrated threads;
presenting a display of the extracted documents on a screen;
receiving a determination result of relevance of the extracted documents from a user based on the display of the extracted documents;
classifying the extracted documents having a same determination result and determining a common element commonly appearing among the extracted elements of the extracted documents having the same determination result;
recording the common element;
searching the plurality of documents for the common element to create a search result; and
calculating a relevance score of at least one of the plurality of documents, the relevance score indicating relevance of the at least one of the plurality of documents based on the search result.

8. A system comprising:
at least one processor;
memory storing instructions configured to instruct the at least one processor to perform:
acquiring digital information recorded in a plurality of computers or a server, wherein the acquired digital information includes a plurality of documents having supplementary information;

verifying supplementary information originally contained in each of the plurality of documents included in the digital information and classifying each of the documents into a plurality of threads based on the supplementary information, wherein the supplementary information includes information about the respective document for structuring document data thereof;

extracting elements included in the supplementary information of the classified documents for each thread of the plurality of threads and analyzing similarity between the plurality of threads based on the elements extracted from each thread;

integrating the threads based on the similarity between the plurality of threads to create a plurality of integrated threads;

extracting a predetermined number of extracted documents from the plurality of the integrated threads;

presenting a display of the extracted documents on a screen;

receiving a determination result of relevance of the extracted documents from a user based on the display of the extracted documents;

classifying the extracted documents having a same determination result and determining a common element commonly appearing among the extracted elements of the extracted documents having the same determination result;

recording the common element;

searching the plurality of documents for the common element to create a search result; and calculating a relevance score of at least one of the plurality of documents, the relevance score indicating relevance of the at least one of the plurality of documents based on the search result.

* * * * *